US009528852B2

(12) United States Patent
Eronen et al.

(10) Patent No.: US 9,528,852 B2
(45) Date of Patent: Dec. 27, 2016

(54) METHOD AND APPARATUS FOR GENERATING AN AUDIO SUMMARY OF A LOCATION

(75) Inventors: Antti Johannes Eronen, Tampere (FI); Miska Matias Hannuksela, Ruutana (FI); Toni Heittola, Tampere (FI); Annamaria Mesaros, Tampere (FI); Tuomas Virtanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1104 days.

(21) Appl. No.: 13/410,690

(22) Filed: Mar. 2, 2012

(65) Prior Publication Data

US 2013/0231761 A1    Sep. 5, 2013

(51) Int. Cl.
*G06F 17/00* (2006.01)
*G01C 21/36* (2006.01)
*G10L 25/54* (2013.01)
*G06F 3/16* (2006.01)

(52) U.S. Cl.
CPC ........... *G01C 21/3697* (2013.01); *G10L 25/54* (2013.01); *G06F 3/167* (2013.01)

(58) Field of Classification Search
CPC ......... G01C 21/00; G01C 21/26; G01C 21/36; G01C 21/3679; G01C 21/3691; G01C 21/3697; G06F 3/16; G06F 3/167; G06F 7/06; G06F 7/08; G06F 7/14; G06F 7/16; G06F 7/22; G06F 7/24; G06F 7/32; G06F 7/36; G06F 3/0841; G06F 17/241; G06F 17/2785; G06F 17/30017; G06F 17/30241; G06F 17/3087; G10L 25/00; G10L 25/48; G10L 25/54; G10L 15/08; G10L 15/1822; G10L 15/22; G09B 29/00

USPC ... 381/2, 56, 61, 124; 700/94; 701/400, 428, 701/431, 441, 537, 538; 704/235; 715/230–233, 715/727
See application file for complete search history.

(56) References Cited

U.S. PATENT DOCUMENTS

| | | | |
|---|---|---|---|
| 2005/0281410 A1 | 12/2005 | Grosvenor et al. | |
| 2008/0234844 A1* | 9/2008 | Boustead et al. | 700/94 |
| 2009/0147961 A1* | 6/2009 | Lee et al. | 381/2 |
| 2011/0137437 A1* | 6/2011 | Jonsson | 700/94 |

OTHER PUBLICATIONS

T. Virtanen; "Monaural Sound Source Separation by Non-Negative Matrix Factorization with Temporal Continuity and Sparseness Criteria"; IEEE Transactions on Audio Speech, and Language Processing; vol. 15, No. 3, Mar. 2007.
(Continued)

*Primary Examiner* — Duc Nguyen
*Assistant Examiner* — Alexander Eljaiek
(74) *Attorney, Agent, or Firm* — Alston & Bird LLP

(57) ABSTRACT

Various methods are described for generating an audio summary representing a location on a place exploration service. One example method may comprise receiving at least one audio file. The method may further comprise dividing the at least one audio file into one or more audio segments. Additionally, the method may comprise determining a representative audio segment for each of the one or more audio segments. The method may further comprise generating an audio summary of the at least one audio file by combining one or more of the representative audio segments of the one or more audio segments. Similar and related methods, apparatuses, and computer program products are also provided.

18 Claims, 4 Drawing Sheets

(56) References Cited

OTHER PUBLICATIONS

T. Virtanen and M. Helen; "Probabilistic Model Based Similarity Measures for Audio Query-by-Example"; in Proceedings of the IEEE Workshop on Applications of Signal Processing to Audio and Acoustics (WASPAA '07), pp. 82-85, New Paltz, NY, USA, Oct. 2007.
C.J. Leggetter and P.C. Woodland; "Flexible Speaker Adaptation Using Maximum Likelihood Linear Regression"; Proc. ARPA Spoken Language Technology Workshop, 2005.
F. Hilger and H. Ney; "Quantile Based Histrogram Equalization for Noise Robust Large Vocabulary Speech Recognition"; IEEE Transactions on Audio, Speech, and Language Processing; vol. 14, No. 3; 2006.
M. Mandel and D. Ellis; "Song-Level Features and Support Vector Machines for Music Classification"; Proc. Int. Conf. on Music Info. Retrieval ISMIR-05, London, Sep. 2005.
M. Helen and T. Virtanen; "Audio Query by Example Using Similarity Measures Between Probability Density Functions of Features"; EURASIP Journal on Audio, Speech and Music Processing; vol. 2010; Article ID-179303.
G. Salton and C. Buckley; "Term-Weighting Approaches in Automatic Text Retrieval"; Information Processing & Management; vol. 24, No. 5, pp. 513-523; 1988.
S. Robertson; "Understanding Inverse Document Frequency: On Theoretical Arguments for IDF"; Journal of Documentation; vol. 60, No. 5, pp. 503-520; 2004.
T. Hoffman; "Probabilistic Latent Semantic Analysis"; in Proceedings of the Fifteenth Conference on Uncertainty in Artificial Intelligence (UAI'99), 1999, pp. 289-296.
International Search Report and Written Opinion for Application No. PCT/FI2013/050044, dated Jun. 28, 2013.
Urban Remix; "What is Urban Remix?"; Downloaded from http://urbanremix.gatech.edu/ on Nov. 2, 2012; 2 pages.
Tristan Jehan; "Creating Music by Listening"; Massachusetts Institute of Technology; Sep. 2005; Downloaded at http://web.media.mit.edu/~tristan/phd/pdf/Tristan_PhD_MIT.pdf; 137 pages.

* cited by examiner

METHOD AND APPARATUS FOR GENERATING AN AUDIO SUMMARY OF A LOCATION

TECHNICAL FIELD

Embodiments of the present invention relate generally to communication technology, and, more particularly, relate to a method and apparatus for generating an audio summary representing a location on a place exploration service.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

One area where consumer demand has rapidly increased involves place exploration services, that is, mapping application services that allow a user to visualize a location on a map displayed on her mobile device. Generally the images and videos that are captured to provide the visualization originate from satellite imagery or from video/still cameras mounted on a vehicle that is driven through the location. In this way, the vehicle may quickly traverse a large area snapping photographs or capturing video to use in the place exploration service. Because the vehicle moves so quickly through any given area, a very small amount, if any, of audio data related to a particular location may be captured. This small amount of audio data is not sufficient to generate an audible representation of any location along the vehicle's path. Furthermore, it may not be economically feasible to adjust the process for capturing video to allow the vehicle to capture large amounts (e.g., long clips) of representative audio data at each location on the map.

Accordingly, it may be desirable to provide systems, methods, apparatuses, and computer program products for generating an audio summary representing a location on a place exploration service in an efficient and cost-effective manner.

SUMMARY

Methods, apparatuses, and computer program products are herein provided for generating an audio summary representing a location on a place exploration service. Various embodiments of the present invention comprise advantageous methods for creating soundscapes for place exploration services. For example, audio samples may be combined and rearranged to create longer and varying audio ambiances based on a limited set of audio material. The audio material may be collected by professional users or crowd-sourced from mobile phone users. During audio summarization, input audio files associated with a location may be analyzed to determine a sequence of events represented by the audio files. A representative audio segment may be extracted or obtained for each event in the sequence and for other audio portions not associated with an event. The audio may be summarized by concatenating the representative audio segments.

According to advantageous embodiments, an audio summary may be a relatively short, loopable, summary sound file based on a collection of sound files acquired for a certain location. By conducting audio summarization, in advantageous embodiments, an audio signal may be generated that compactly represents the most important characteristics of a set of input audio files, for example recorded from a certain location at a certain time. The characteristics referred to above may include generic acoustic properties of the signal and the types of sound events that occur in the given audio files.

In an example embodiment, a method is provided, comprising obtaining at least one audio file; dividing the at least one audio file into one or more audio segments; determining a representative audio segment for each of the one or more audio segments; generating an audio summary of the at least one audio file by combining one or more of the representative audio segments of the one or more audio segments.

In another example embodiment, an apparatus comprising at least one processor and at least one memory storing computer program code is provided. The at least one memory and stored computer program code are configured, with the at least one processor, to cause the apparatus of this example embodiment to at least obtain at least one audio file; divide the at least one audio file into one or more audio segments; determine a representative audio segment for each of the one or more audio segments; generate an audio summary of the at least one audio file by combining one or more of the representative audio segments of the one or more audio segments.

In yet another example embodiment, a computer program product is provided. The computer program product of this example embodiment includes at least one computer-readable storage medium having computer-readable program instructions stored therein. The program instructions of this example embodiment comprise program instructions configured to obtain at least one audio file; divide the at least one audio file into one or more audio segments; determine a representative audio segment for each of the one or more audio segments; generate an audio summary of the at least one audio file by combining one or more of the representative audio segments of the one or more audio segments.

In another example embodiment, an apparatus is provided, which comprises means for obtaining at least one audio file; dividing the at least one audio file into one or more audio segments; determining a representative audio segment for each of the one or more audio segments; generating an audio summary of the at least one audio file by combining one or more of the representative audio segments of the one or more audio segments.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described some example embodiments of the invention in general terms, reference will now be made to the accompanying drawings, which are not necessarily drawn to scale, and wherein:

DETAILED DESCRIPTION

Figure 1:
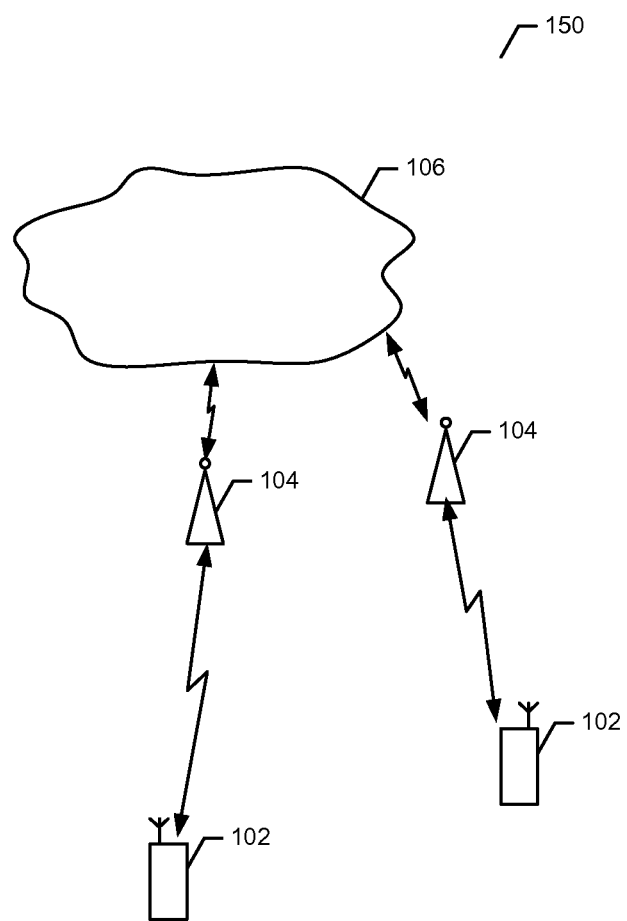
FIG. 1 illustrates a system for generating an audio summary representing a location on a place exploration service according to some example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

The term "map," as used herein, is not meant to be limiting and may refer to any type of visualization of a location. For example, a map may be, but is not limited to, any conventional map (e.g., a two-dimensional or three-dimensional map), any schematic map, a full (e.g., 360-degree) or partial (e.g., 180-degree) map view, satellite imagery, and/or the like.

Referring now to FIG. 1, FIG. 1 illustrates a block diagram of a system 150 for generating an audio summary representing a location on a place exploration service according to an example embodiment. It will be appreciated that the system 150 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for generating an audio summary representing a location on a place exploration service, numerous other configurations may also be used to implement embodiments of the present invention.

The system 150 may include one or more terminal apparatuses 102 and one or more serving network apparatuses 104. The system 150 may further comprise a network 106. The network 106 may comprise one or more wireline networks, one or more wireless networks, or some combination thereof. The network 106 may, for example, comprise a serving network (e.g., a serving cellular network) for one or more terminal apparatuses 102. The network 106 may comprise, in certain embodiments, one or more of the terminal apparatuses 102 and serving network apparatuses 104 themselves. According to example embodiments, the network 106 may comprise the Internet. The network 106 may comprise, in some embodiments, a Content Delivery Network (CDN), which may also be referred to as a Content Distribution Network. In various embodiments, the network 106 may comprise a wired access link connecting one or more terminal apparatuses 102 to the rest of the network 106 using, for example, Digital Subscriber Line (DSL) technology. In some embodiments, the network 106 may comprise a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of Third Generation Partnership Project (3GPP) LTE (also referred to as LTE-A) standards, current and future implementations of International Telecommunications Union (ITU) International Mobile Telecommunications—Advanced (IMT-A) systems standards, and/or the like. It will be appreciated, however, that where references herein are made to a network standard and/or terminology particular to a network standard, the references are provided merely by way of example and not by way of limitation.

According to various embodiments, one or more terminal apparatuses 102 may be configured to connect directly with one or more serving network apparatuses 104 via, for example, an air interface without routing communications via one or more elements of the network 106. Alternatively, one or more of the terminal apparatuses 102 may be configured to communicate with one or more of the serving network apparatuses 104 over the network 106. In this regard, the serving network apparatuses 104 may comprise one or more nodes of the network 106. For example, in some example embodiments, the serving network apparatuses 104 may be at least partially embodied on one or more computing devices that comprise an element of a radio access network (RAN) portion of the network 106. In this regard, the serving network apparatuses 104 may, for example, be at least partially embodied on an access point of the network 106 (for example, a macrocell, microcell, picocell, femtocell, closed subscriber group (CSG) cell, base station, base transceiver station (BTS), node B, evolved node B, access point (AP), group owner, mesh station (STA), mesh point, and/or the like), which may, for example be configured to provide access to the network 106 (e.g., via a radio uplink) to one or more of the terminal apparatuses 102. Accordingly, each of the serving network apparatuses 104 may comprise a network node or a plurality of network nodes collectively configured to perform one or more operations attributed to the serving network apparatus 104 as described with respect to various example embodiments disclosed herein. In other embodiments, the serving network apparatuses 104 may be at least partially embodied as a database, for example an audio file/segment database or an audio summary database.

A terminal apparatus 102 may be embodied as any computing device, such as, for example, a desktop computer, laptop computer, mobile terminal, mobile computer, mobile phone, mobile communication device, tablet computing device, game device, digital camera/camcorder, audio/video player, television device, radio receiver, digital video recorder, positioning device, wrist watch, portable digital assistant (PDA), fixed transceiver device (e.g., attached to traffic lights, energy meters, light bulbs, and/or the like), a chipset, an apparatus comprising a chipset, any combination thereof, and/or the like.

Figure 2:
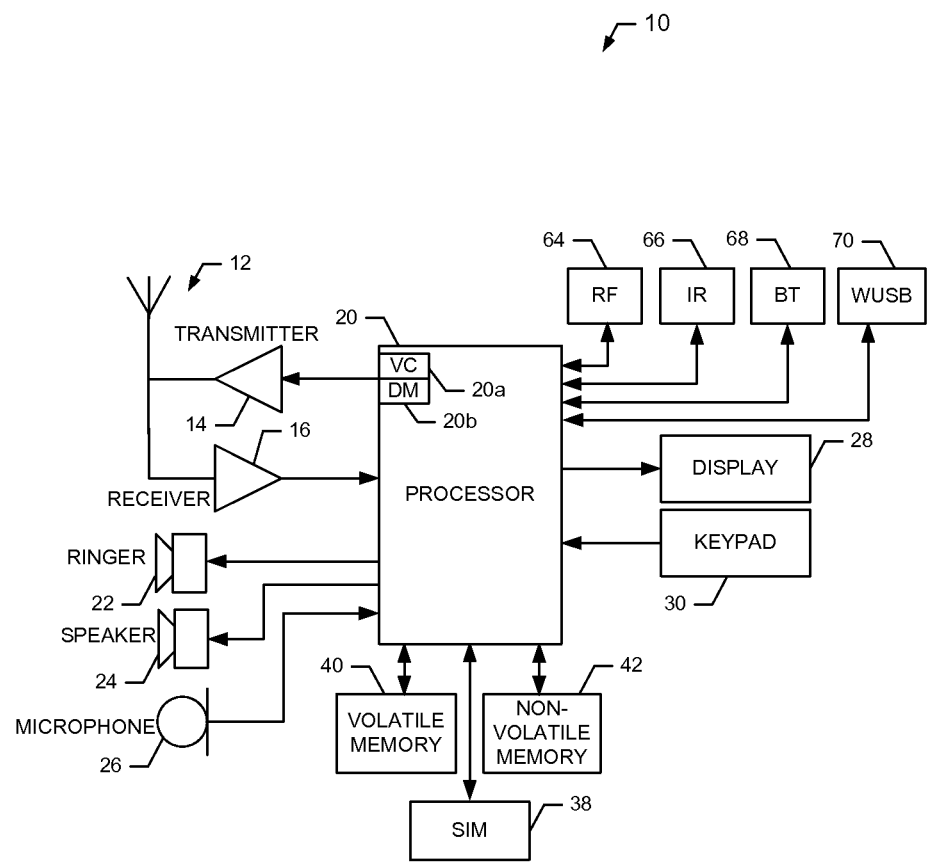
FIG. 2 illustrates a schematic block diagram of a mobile terminal according to some example embodiments of the present invention.

In some example embodiments, a terminal apparatus 102 may be embodied as a mobile terminal, such as that illustrated in FIG. 2. In this regard, FIG. 2 illustrates a block diagram of a mobile terminal 10 representative of one embodiment of a terminal apparatus 102. It should be understood, however, that the mobile terminal 10 illustrated and hereinafter described is merely illustrative of one type of computing device (i.e., terminal apparatus 102) that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division- Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols such as LTE Advanced and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX™) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The processor 20 may further be capable of implementing a daemon process running on a service back end. Additionally, the processor 20 may be configured to implement software as part of a cloud service. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to low power/energy or ultra-low power/energy Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
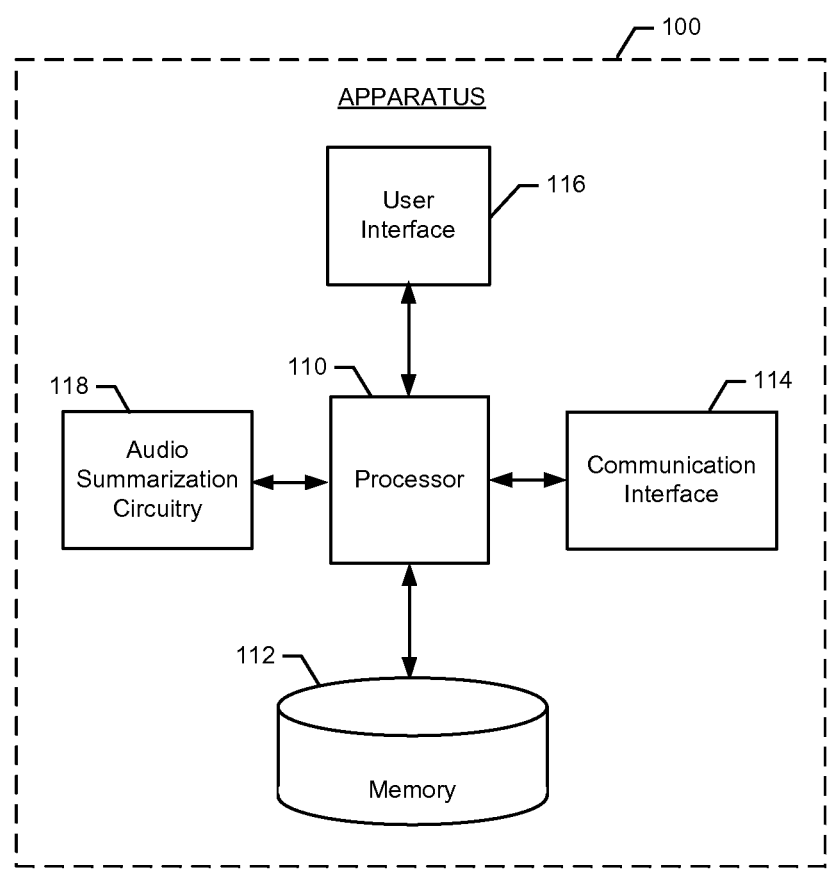
FIG. 3 illustrates a block diagram of an apparatus according to some example embodiments of the present invention.

In various embodiments, for example, a terminal apparatus 102 and/or a serving network apparatus 104 may be embodied as or otherwise include an apparatus 100 as generically represented by the block diagram of FIG. 3. In the example embodiment, the apparatus 100 may comprise various means for performing the various functions herein described. These means may comprise one or more of a processor 110, memory 112, communication interface 114, user interface 116, or audio summarization circuitry 118.

The means of the apparatus 100 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 112) that is executable by a suitably configured processing device (e.g., the processor 110), or some combination thereof.

In some example embodiments, one or more of the means illustrated in FIG. 3 may be embodied as a chip or chip set. In other words, the apparatus 100 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or audio summarization circuitry 118 may be embodied as a chip or chip set. The apparatus 100 may therefore, in some example embodiments, be configured to implement embodiments of the present invention on a single chip or as a single "system on a chip." As another example, in some example embodiments, the apparatus 100 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 110 may comprise a plurality of processors. The plurality of processors may be in operative communication with each other and may be collectively configured to perform one or more functionalities of the apparatus 100 as described herein. The plurality of processors may be embodied on a single computing device or distributed across a plurality of computing devices collectively configured to function as the apparatus 100. In embodiments wherein the apparatus 100 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the apparatus 100 to perform one or more of the functionalities of the apparatus 100 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory. Although illustrated in FIG. 3 as a single memory, the memory 112 may comprise a plurality of memories. The plurality of memories may be embodied on a single computing device or may be distributed across a plurality of computing devices collectively configured to function as the apparatus 100. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 100 is embodied as a mobile terminal 10, the memory 112 may comprise the volatile memory 40 and/or the non-volatile memory 42. The memory 112 may be configured to store information, data, applications, instructions, or the like for enabling the apparatus 100 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the audio summarization circuitry 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an example embodiment, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 100 and one or more computing devices or computing resources may be in communication. As an example, the communication interface 114 may be configured to enable communication between the apparatus 100 and another device, such as another terminal apparatus 102 or serving network apparatus 104. As a further example, the communication interface 114 may be configured to enable communication with another terminal apparatus 102 or serving network apparatus 104 via the network 106. The communication interface 114 may additionally be in communication with the memory 112, user interface 116, and/or audio summarization circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or audio summarization circuitry 118, such as via a bus.

The audio summarization circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In embodiments wherein the audio summarization circuitry 118 is embodied separately from the processor 110, the audio summarization circuitry 118 may be in communication with the processor 110. The audio summarization circuitry 118 may further be in communication with one or more of the memory 112, communication interface 114, or user interface 116, such as via a bus.

Figure 4:
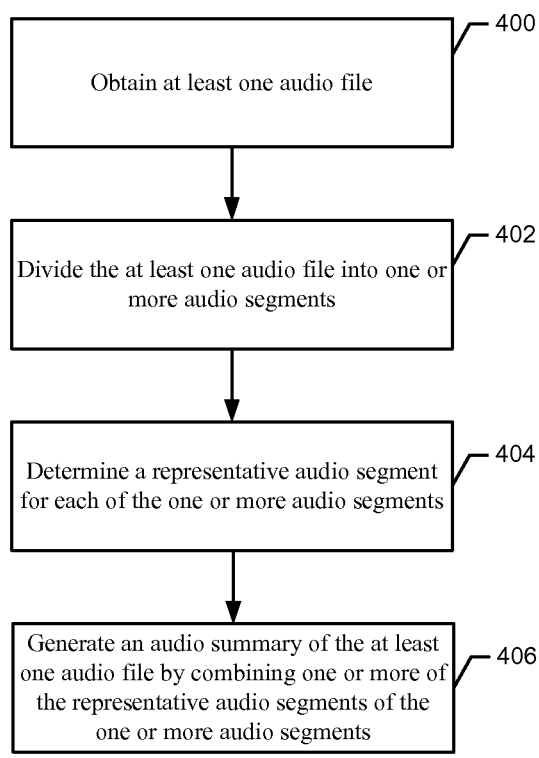
FIG. 4 illustrates a flowchart according to an example method for generating an audio summary representing a location on a place exploration service according to some example embodiments of the present invention.

FIG. 4 is a flowchart illustrating the operations performed by a method, apparatus, and computer program product, such as apparatus 100 of FIG. 3. In accordance with an example embodiment of the present invention, the operations may be performed from the perspective of a terminal apparatus 102, for example, in an instance in which the terminal apparatus 102 performs the operations of both a front-end and back-end of the service. In another example embodiment of the present invention, a subset of the operations may be performed from the perspective of a terminal apparatus 102 and the remainder of the operations may be performed from the perspective of a serving network apparatus 104. For example, the terminal apparatus 102 may perform operations associated with a front-end of the service (e.g., operations related to the user interface) while the serving network apparatus 104 may perform operations associated with a back-end of the service (e.g., analyzing and processing media segments and generating a summary). In yet another example embodiment, the operations may be performed from the perspective of a serving network apparatus 104. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 112 of an apparatus 100 employing an embodiment of the present invention and executed by a processor 110 in the apparatus, in some instances via audio summarization circuitry 118.

As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

As such, the operations of FIG. 4, when executed, convert a computer or processing circuitry into a particular machine configured to perform an example embodiment of the present invention. Accordingly, the operations of FIG. 4 define an algorithm for configuring a computer or processing circuitry, e.g., processor 110, to perform an example embodiment. In some cases, a general purpose computer may be provided with an instance of the processor which performs the algorithm of FIG. 4 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Referring now to FIG. 4, the operations performed by a method, apparatus and computer program product of an example embodiment are illustrated from the perspective of an apparatus 100 embodied as a terminal apparatus 102 that generates an audio summary representing a location on a place exploration service.

According to example embodiments, the apparatus 100 may be configured to provide a front-end interface (e.g., user interface 116) for receiving location exploration input. In this regard, the apparatus 100 may be configured to receive a selection of a location for which a user desires to generate an audio summary representing the audio ambiance of the selected location. The location may be associated with a position (e.g., Global Positioning System (GPS) location) on a map or mapping application displayed by the apparatus 100 (e.g., Ovi Maps 3D, Google Earth, or the like). In response to the selection, the apparatus 100 may be configured to display a view of the selected location (e.g., a planar or 360 degree view of the selected map location). The apparatus 100 may further be configured to generate and produce an audio summary, which may provide a characteristic audio ambiance associated with the location.

The apparatus 100 embodied by the terminal apparatus 102 may include means, such as the audio summarization circuitry 118, the processor 110 or the like, for obtaining at least one audio file. See block 400 of FIG. 4. In example embodiments, the apparatus 100 may be configured to receive at least one audio file from storage, for example, from a database or a memory (e.g., memory 112). The database may be located locally, for example on the terminal apparatus 102, or externally, for example on the serving network apparatus 104. The database may be configured to store multiple types of audio files or segments. One type of audio file may be a user input audio file, for example a crowd-sourced audio file. Another type of audio file may be a reference audio file, for example an audio file created by high quality equipment or purchased from an audio data provider. In certain embodiments, the audio file may comprise an indication identifying whether the audio file is an input audio file or a reference audio file. In some embodiments, an audio file may be a part of a multimedia file or a multimedia presentation. For example, an input audio file and/or a reference audio file may comprise one or more audio tracks and/or the like in a video file, such as a file complying with the International Organization for Standardization (ISO) Base Media File Format and/or one or more of its derivatives (e.g. Moving Pictures Expert Group (MPEG)-4 file format (MP4), 3GPP file format (3GP), Digital Video Broadcasting (DVB) file format, and/or the like), the QuickTime file format, the Audio Video Interleave (AVI) file format, the Matroska file format, and/or the like. In another example, an input audio file and/or a reference audio file may comprise one or more audio tracks and/or the like in a multimedia presentation, which may be described for example using Synchronized Multimedia Integration Language (SMIL), Scalable Vector Graphics (SVG), Hypertext Markup Language (HTML), Media Presentation Description (MPD) of MPEG Dynamic Adaptive Streaming over HTTP (DASH), and/or the like.

According to example embodiments, the apparatus 100, such as the audio summarization circuitry 118 or the processor 110, may be configured to provide an interface (e.g., user interface 116) for receiving the at least one audio file. The interface may, for example, be a front-end for receiving audio files from users. In this regard, a user may be a typical day-to-day user capturing audio files via the apparatus 100 or another mobile or portable device with audio recording capabilities. The user may, in some instances, be an employee contracted to travel to various locations in order to record audio files of the location (e.g., based on an employment plan). The interface may allow the user to copy, upload, or otherwise transfer the audio file to the apparatus 100.

The apparatus 100, such as the audio summarization circuitry 118 or the processor 110, may be configured to provide for storage of the audio file in a database, whether located locally or remotely. The audio may be compressed with Advanced Audio Coding (AAC) format, MPEG-1 or MPEG-2 Audio Layer III (MP3) format, or any other audio coding format. In some instances, the audio may be encapsulated in an audio file in Waveform Audio File Format (WAV), MP4, or any other audio or multimedia file format. In various embodiments, the audio file may comprise other media elements or tracks and/or the like, such as an image or a photo or a video track.

In various embodiments, the apparatus 100 may be configured to provide for storage location information associated with the audio file. For example, the apparatus 100 may provide for storage of Global Positioning System (GPS) information, such as GPS coordinates, where the audio file was captured or recorded. In this regard, the apparatus 100 and/or other recording device used to capture the audio file may be configured to provide GPS information. For example, the apparatus 100 and/or other recording device may comprise a GPS tracking device for providing GPS logging capabilities. In other embodiments, the location information may be input manually or obtained from an external location information device (e.g., GPS device). The location information may be linked to the audio file, for example, the apparatus 100 may provide for storage of the audio file and location information in a combined structure, proximate to each other, containing a link to each other, and/or the like. In some instances, the location information may comprise, for example, one or more of the following: latitude, longitude, and altitude (e.g., obtained via GPS); a cell identifier of a mobile network (e.g., GSM or UMTS); an indoor location (e.g., a position on a floor plan), and/or the like.

According to example embodiments, the apparatus 100 may be configured to associate one or more context parameters with the audio files (i.e., the input audio files and/or reference audio files). The context parameters may include but are not limited information related to the circumstances of the recording of the audio files, such as the time of day, the time of year, a classification of the audio file as being recorded indoors or outdoors, the weather conditions (e.g., raining, snowing, fair weather, or the like), information from a proximity sensor associated with the apparatus 100 or other recording device (e.g., whether the apparatus 100 was located in a pocket, bag, or the like when the audio file was recorded), and/or the like. The one or more context parameters may supplement the location information, and in some instances may provide more detail regarding the location (e.g., urban, rural, street, field, etc.). In example embodiments, the apparatus 100 may provide for storage of the context parameters and/or link the context parameters to the audio file and/or location information according to similar methods described above with respect to storing and linking the location information with the audio file.

According to example embodiments, the apparatus 100 may be configured to use one or more images and/or video tracks associated with or included in an audio file to derive context parameters for the audio file (i.e., the input audio file and/or reference audio file). For example, visual descriptors or features may be derived from the one or more images and/or video tracks, which may describe, for example, color, shape, regions, textures, motion, and/or the like. In another example, the descriptors specified in MPEG-7 may be used. In some instances, color descriptors may characterize color distribution and the color relation between sequences of images; shape descriptors may describe regions, contours, shapes, and/or the like for 2D images and for 3D volumes in an image or image sequence; texture descriptors may characterize homogeneity of regions; and motion descriptors may characterize object motion in an image sequence and/or camera motion.

The apparatus 100 embodied by the terminal apparatus 102 may include means, such as the audio summarization circuitry 118, the processor 110 or the like, for dividing the at least one audio file into one or more audio segments. See block 402 of FIG. 4. According to example embodiments, the apparatus 100 may be configured to identify one or more events based at least in part on which the audio file may be divided. In other embodiments, the apparatus 100 may segment, separate, and/or cluster the audio file in an unsupervised manner, without regard to events contained within the audio file.

In an instance in which the apparatus 100, such as the audio summarization circuitry 118 or the processor 110, divides the audio file based on events, an event detection algorithm may be applied to the audio file to identify the events contained therein, for example via sound source separation. In this regard, the audio file may be divided based on the identified events, portions of the identified events, groups of identified events (e.g., similar events), and/or the like. The apparatus 100, in some embodiments, may generate one or more event identifiers (e.g., car, wind, dog barking, etc.) representing the one or more events in the audio file. The event identifiers may be subsequently used by the apparatus 100 to determine a representative audio segment for an audio segment containing the respective event(s).

In an instance in which the apparatus 100, such as the audio summarization circuitry 118 or the processor 110, divides the audio file without respect to events contained within the audio file, the apparatus 100 may attempt to divide the audio file into one or more homogeneous clusters. That is, the apparatus 100 may segment and/or separate the audio file into various parts and combine one or more of the parts to form clusters that are substantially homogeneous and model similar sounds. In this regard, the apparatus 100 may divide the audio file into clusters having similar local audio attributes, such as the spectrum measured in short frames. For example, in an instance in which the audio file comprises two parts, first a low-frequency noise and then a high frequency noise, then the spectral measurements extracted from the low-frequency noise part of the audio may be clustered into the same cluster, while the spectral measurements extracted from the high-frequency noise part of the audio may be clustered into another cluster. In some instances, the division into clusters may be automatic and/or unsupervised. The apparatus 100 may utilize one or more cluster indices to represent the location of the clusters within the audio file. Some clusters may have multiple indices representing multiple locations in the audio file that make up the cluster. In these instances, the cluster indices may be in the order of the parts that make up the cluster.

According to example embodiments, a combination of event-based and non-event based methods may be used by the apparatus 100 to divide the audio file. For example, an event detection approach may be used to detect and identify significant events. Subsequently, unsupervised analysis (e.g., clustering) may be performed on any sounds not classified as an event by the event detection algorithm.

The apparatus 100 embodied by the terminal apparatus 102 may include means, such as the audio summarization circuitry 118, the processor 110 or the like, for determining a representative audio segment for each of the one or more audio segments. See block 404 of FIG. 4. In this regard, the apparatus 100 may be configured to select all or a portion of a respective audio segment, a variation of all or a portion of a respective audio segment, an audio segment similar to a respective audio segment, or the like as the representative audio segment.

In an instance in which the apparatus 100 selects a portion of an audio segment as the representative audio segment for that audio segment, the apparatus 100 may be configured to select a portion of the audio segment having characteristics representative of the audio segment. For example, the apparatus 100 may select all or a portion of the audio segment corresponding to an event identified within the audio segment. The presence of speech in an audio segment associated with a particular location may not be representative of the location, or, for privacy considerations, may not be desirable to be included in the summary. Accordingly, in some instances, the apparatus 100 may select a portion of the audio segment without audible speech as the representative audio segment. In an embodiment where the audio segment itself is used to generate the representative audio segment, the majority of the original audio segment may be used, though in many instances in a rearranged fashion. In another example embodiment, in an instance in which the audio segment contains music, the apparatus 100 may decide to use that audio segment or portion of the audio segment in the original order without splitting it into smaller parts and shuffling to ensure that the music maintains its original sound.

In an instance in which the apparatus 100 selects a variation of all or a portion of an audio segment as the representative audio segment for that audio segment, the apparatus 100 may be configured to manipulate the audio segment. In one embodiment, the audio segment may first be split into one or more component segments and randomized to remove any intelligible speech information. That is, the audio segment may be modified by rearranging short component segments of itself in a different order. The component segments may be uniform or substantially uniform in length. For example, the component segments may be determined based on a particular duration of time. In some embodiments, the length of each component segment may be any period of time lasting one second or less. In other embodiments, sound separation methods may be used to remove any speech from the audio segment. The remaining audio, or a portion thereof, may be selected by the apparatus 100 as the representative audio segment for that audio segment.

In an instance in which the apparatus 100 selects an audio segment similar to a respective audio segment as the representative audio segment for that audio segment, the apparatus 100 may be configured to select the similar audio segment from a database. As noted above, the database may contain one or more reference audio segments, generally of higher quality, to be used in place of the actual audio segment. According to one embodiment, whether the audio segment is event based or a non-event based cluster, the apparatus 100 may search for an audio segment in the database that contains a similar sound to the audio segment. In example embodiments, the apparatus 100 may be configured to select the similar audio segment based at least in part on a comparison of the event identifiers associated with the audio segment and the event identifiers associated with the one or more audio segments in the database. In other embodiments, the apparatus 100 may be configured to select the similar audio segment based at least in part on the similar audio segment having a similar sound to the cluster. In an instance of these embodiments, the representative audio segment may be generated by concatenating the similar audio segments into the order defined by the cluster indices.

The apparatus 100 embodied by the terminal apparatus 102 may include means, such as the audio summarization circuitry 118, the processor 110 or the like, for generating an audio summary of the at least one audio file by combining one or more of the representative audio segments of the one or more audio segments. See block 406 of FIG. 4. Combining the representative audio segments may comprise, but is not limited to, concatenating, mixing, shuffling, cutting, or overlapping the representative audio segments. The apparatus 100 may be further configured to provide for storage of the audio summary in a storage location, such as a database. The audio summary database may be distinct from the audio file/segment database described above. Location information associated with the audio summary may be linked to or stored with the audio summary. The location information may reflect the location that the audio summary represents.

According to various embodiments, the apparatus 100, such as the audio summarization circuitry 118 or the processor 110, may combine every representative audio segment into an audio summary, while in other embodiments only a subset of the representative audio segments may be used to generate the audio summary. In some instances, it may be difficult to determine which audio segments, or which events with which certain audio segments are associated, should be included in the audio summary. In these instances, all of the representative audio segments may be combined to generate the audio summary. In other embodiments, the apparatus 100 may reduce the number of representative media segments by random elimination, numerical elimination (e.g., only the first X representative audio segments), frequency-based elimination (e.g., based on inverse document frequency, probabilistic latent semantic analysis, or the like), and/or the like.

In some embodiments, the subset of representative audio segments may be selected by the apparatus 100 for inclusion in the audio summary based at least in part on location information, such as the location where the recording of the audio segment associated with the representative audio segment (or the representative audio segment itself) took place. For example, the audio segments with the closest location coordinates to the coordinates of the location for which the audio summary is generated may be selected to be used in the audio summary. In an example embodiment, a location probability may be associated with the audio segment, such that the location probability represents a likelihood that the sounds or events represented by the audio segment would be audible at the location associated with the audio summary. The location probability may be based at least in part on the distance between the location where the respective audio segment was recorded and the location for which the audio summary is generated. In some instances, the location probability may be proportionally based on the distance. In this regard, audio segments recorded relatively closer to the desired audio summary location may receive a relatively higher location probability and therefore may be more likely to appear in the audio summary than an audio segment recorded relatively farther from the desired audio summary location and thus having a relatively lower location probability. In other embodiments, representative audio segments with a relatively high location probability may be included at a relatively high volume in the audio summary, while representative audio segments with a relatively low location probability may be included at a relatively low volume in the audio summary, which may allow the apparatus 100 to imitate different distances of sounds from the location of the audio summary.

The location probability, according to example embodiments, may be used by the apparatus 100 in various ways when generating the audio summary. For example, the location probability may be used to select a mean interval for a certain representative audio segment (e.g., corresponding to an audio segment associated with a particular event) to appear in the audio summary or to select a volume or magnitude for the respective representative audio segment in the audio summary. The distance metric for generating the location probability may be, for example, the Euclidean distance of geographical coordinates. In other embodiments, the distance metric may be a weighted Euclidean distance based on the known environment surrounding the location, for example the location of buildings, streets, roads, or other sound sources. For example, an audio segment associated with a location that is classified as being in the same physical environment as the location of the audio summary may receive a relatively larger weight for calculating the weighted Euclidean distance than an audio segment associated with a location classified as being in a different environment. In an instance in which the location for the audio summary corresponds to a street, for example, an audio segment also corresponding with a street may receive a relatively higher weight (e.g., 1.0), while an audio segment classified as corresponding with a park or forest may receive a relatively lower weight (e.g., 0.2). In some instances, audio segments associated with a different physical environment may be omitted from the audio summary. In some embodiments, an indoor location or position may be used. For example, the indoor location or position may be relative to a floor plan or the like. The distance metric for an indoor location may take into account physical barriers, such as walls and/or the like, which may affect the propagation of sounds. For example, an audio summary may be derived from only those input audio files that originate from the room where the selected location for the audio summary resides.

According to example embodiments, the apparatus 100, such as the audio summarization circuitry 118 or the processor 110, may select the representative audio segments used to generate the audio summary based at least in part on one or more context parameters, in addition to or instead of location information. For example, representative audio segments associated with recordings made indoors may not be combined with representative audio segments associated with recordings made outdoors. In an instance in which proximity sensor data indicates that the apparatus 100 or recording device was covered at the time the audio segment was recorded, the apparatus 100 may determine not to use the associated representative audio segment to generate the audio summary.

In various embodiments, a context probability may be associated with an audio segment, such that the context probability is based at least in part on the difference between a metric of a property associated with the respective audio segment and the same metric of the same property associated with the audio summary. For example, in an instance in which the audio summary is associated with night time (e.g., from 10 pm to 6 am), a context probability may be relatively higher for audio segments recorded during night time than for audio segments recorded during other times of the day.

In various embodiments, an audio summary may be generated for a map or mapping application displayed by the apparatus 100 (e.g., Ovi Maps 3D, Google Earth, and/or the like). The apparatus 100 may be configured to visualize a selected location, in some embodiments, through a 360-degree image view (e.g., Google Street View), geographically placed photos (e.g., Nokia Image Space), or photos or videos superimposed on a 3D model of the surroundings, where the various visualizations may be derived from images, videos, or other captured and digitally sampled data (e.g., Light Detection And Ranging (LIDAR) data) related to the selected location. Visual descriptors may be derived from the images, videos, and/or other captured and digitally sampled data used for visualization of a selected location. These visual descriptors may be used for deriving a context probability for input audio files and/or reference audio files that also include or are associated with one or more images, video tracks, and/or other captured and digitally sampled data. The context probability may be derived, for example, by calculating a similarity measure between selected visual descriptors of the images, videos, and/or other captured and digitally sampled data used for visualization of a selected location and the corresponding visual descriptors of the images, videos, and/or other captured and digitally sampled data included in or associated with input audio files and/or reference audio files. For example, in an instance in which audio files comprising an included or associated video track has a similar color features compared to the color features of the images used for generating a 360-degree image view for a selected location may be calculated to have a relatively high context probability.

In example embodiments, the apparatus 100 may be configured to combine the representative audio segments by first segmenting the representative audio segments into homogeneous audio pieces. In this regard, the representative audio segments may be split into one or more non-overlapping pieces (e.g., four second chunks). Gaussian mixture models (GMMs) may be trained (e.g., via an Agglomerative EM-algorithm) using a set of audio features for these pieces. The audio features may comprise Mel frequency cepstral coefficients, linear prediction cepstral coefficients (LPCC), perceptual linear prediction cepstral coefficients, and/or the like. Distances between GMMs may be calculated with the empirical symmetric Kullback-Leibler Divergence. The distance measures may be used to form a similarity matrix. Rows in the similarity matrix may be considered as feature vectors for a K-Means algorithm used to cluster the rows. In this regard, similar pieces of the representative audio segments may be clustered together. In some instances, during post processing, the apparatus 100 performing the segmentation may assign to the same segment the consecutive pieces (in time) that belong to the same cluster.

According to various embodiments, the apparatus 100, such as the audio summarization circuitry 118 or the processor 110, may shuffle the representative audio segments in a way that provides timbral continuation when jumping from one segment to another in the audio summary. In some instances, the apparatus 100 may perform gain changes or other processing on the representative audio segments when shuffling and generating the audio summary. In this regard, segment shuffling may assist with the continuity of the sound timbre when combining the representative audio segments to generate the audio summary. Such an ordered randomization approach may generate a homogeneous sound scene, where transitions between representative audio segments may be more pleasant than purely random ordering.

In example embodiments, when generating the audio summary, the apparatus 100 may randomly select the initial representative audio segment. Subsequent representative audio segments may be selected so that the pieces at the borders of the representative audio segments are similar. In this regard, the shuffling may be guided by comparing the end piece (e.g., last four seconds) of the current representative audio segment and the beginning piece (e.g., first four seconds) of potentially subsequent representative audio segments. In some instances, the similarity may be obtained using similar methods as described with respect to clustering.

In some embodiments, the apparatus 100, such as the audio summarization circuitry 118 or the processor 110, may determine a value representing the amount of similarity between the end piece (e.g., last four seconds) of the current representative audio segment and the beginning pieces (e.g., first four seconds) of potentially subsequent representative audio segments. Candidate representative audio segments may be ranked by the amount of similarity. In these instances, the subsequent representative audio segment may be selected from among the top N ranked candidates.

According to example embodiments, each representative audio segment may be used only once in an audio summary, for example when a large amount of representative audio segments are available. Limiting a representative audio segment to a single occurrence in the audio summary may assist in retaining the amount of repetitiveness of the original audio files. In other embodiments, a representative audio segment may be reused after a predefined time interval in order to control the repetitiveness of the summary signal. Reusing representative audio segments in the audio summary may enable the usage of a smaller data set.

In various embodiments, the apparatus 100 may be configured to stack or combine the representative audio segments one after another, based at least in part on an order determined by the methods discussed above. The representative audio segments may be linearly cross-faded in and out inside the representative audio segments to provide for smooth transitions between segments. In some embodiments, more than one representative audio segment may overlap in time. That is, more than one audio event or representative audio segment may be ongoing simultaneously. The volume of representative audio segments overlapping in time may be selected based on the location probability and/or the context probability described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:

obtaining at least one audio file;

identifying one or more audio events in each of the at least one audio file;

dividing each of the at least one audio file into one or more audio segments such that each audio segment corresponds to an audio event identified in the at least one audio file;

generating one or more event identifiers for the one or more audio segments, wherein the one or more event identifiers correspond to the identified one or more audio events;

determining, based on the generated one or more event identifiers, a representative audio segment for each of the one or more audio segments; and generating an audio summary of the at least one audio file by combining one or more of the representative audio segments of the one or more audio segments.

2. The method according to claim 1, wherein obtaining the at least one audio file further comprises:
   receiving a selection of a location on a map;
   determining the at least one audio file corresponding to the location on the map; and
   retrieving the at least one audio file.

3. The method according to claim 1, wherein determining a representative audio segment for each of the one or more audio segments further comprises:
   identifying, based on the generated one or more event identifiers, an audio event associated with a respective audio segment;
   locating a representation of the audio event in a representative audio segment database; and
   selecting the located representation as the representative audio segment for the respective audio segment.

4. The method according to claim 1, wherein determining a representative audio segment for each of the one or more audio segments further comprises:
   dividing the audio segment into one or more audio pieces; and
   rearranging the one or more audio pieces to create the representative audio segment.

5. The method according to claim 1, wherein combining the one or more of the representative audio segments of the one or more audio segments comprises at least one of mixing, cross-fading, overlapping, and concatenating the one or more representative audio segments.

6. The method according to claim 5, wherein combining the one or more of the representative audio segments of the one or more audio segments further comprises:
   selecting an initial representative audio segment;
   determining a difference between the signal of an end portion of the initial representative audio segment and the signal of a beginning portion of each of the remaining representative audio segments; and
   concatenating one of the remaining representative audio segments to the end of the initial representative audio segment, wherein the difference between the signal of the beginning portion of the one of the remaining representative audio segments and the signal of the end portion of the initial one representative audio segment is less than a predefined threshold.

7. An apparatus comprising:
   at least one processor; and
   at least one memory comprising computer program code, the at least one memory and the computer program code configured to, with the at least one processor, cause the apparatus at least to:
   obtain at least one audio file;
   identify one or more audio events in each of the at least one audio file;
   divide each of the at least one audio file into one or more audio segments such that each audio segment corresponds to an audio event identified in the at least one audio file;
   generate one or more event identifiers for the one or more audio segments, wherein the one or more event identifiers correspond to the identified one or more audio events;
   determine, based on the generated one or more event identifiers, a representative audio segment for each of the one or more audio segments; and
   generate an audio summary of the at least one audio file by combining one or more of the representative audio segments of the one or more audio segments.

8. The apparatus according to claim 7, wherein in order to obtain the at least one audio file, the at least one memory and the computer program code are further configured to, with the at least one processor, cause the apparatus to:
   receive a selection of a location on a map;
   determine the at least one audio file corresponding to the location on the map; and
   retrieve the at least one audio file.

9. The apparatus according to claim 7, wherein in order to determine a representative audio segment for each of the one or more audio segments, the at least one memory and the computer program code are further configured to, with the at least one processor, cause the apparatus to:
   identify, based on the generated one or more event identifiers, an audio event associated with a respective audio segment;
   locate a representation of the audio event in a representative audio segment database; and
   select the located representation as the representative audio segment for the respective audio segment.

10. The apparatus according to claim 7, wherein in order to determine a representative audio segment for each of the one or more audio segments, the at least one memory and the computer program code are further configured to, with the at least one processor, cause the apparatus to:
    divide the audio segment into one or more audio pieces; and
    rearrange the one or more audio pieces to create the representative audio segment.

11. The apparatus according to claim 7, wherein combining the one or more of the representative audio segments of the one or more audio segments comprises at least one of mixing, cross-fading, overlapping, and concatenating the one or more representative audio segments.

12. The apparatus according to claim 11, wherein in order to combine the one or more of the representative audio segments of the one or more audio segments, the at least one memory and the computer program code are further configured to, with the at least one processor, cause the apparatus to:
    select an initial representative audio segment;
    determine a difference between the signal of an end portion of the initial representative audio segment and the signal of a beginning portion of each of the remaining representative audio segments; and
    concatenate one of the remaining representative audio segments to the end of the initial representative audio segment, wherein the difference between the signal of the beginning portion of the one of the remaining representative audio segments and the signal of the end portion of the initial one representative audio segment is less than a predefined threshold.

13. A computer program product comprising a non-transitory computer-readable medium bearing computer program code embodied therein for use with a computer, the computer program code being configured to, when executed, cause a computer to:
    obtain at least one audio file;
    identify one or more audio events in each of the at least one audio file;
    divide each of the at least one audio file into one or more audio segments such that each audio segment corresponds to an audio event identified in the at least one audio file;

generate one or more event identifiers for the one or more audio segments, wherein the one or more event identifiers correspond to the identified one or more audio events;

determine, based on the generated one or more event identifiers, a representative audio segment for each of the one or more audio segments; and generate an audio summary of the at least one audio file by combining one or more of the representative audio segments of the one or more audio segments.

14. The computer program product according to claim 13, wherein the computer program code is configured to, when executed, cause the computer to obtain the at least one audio file by causing the computer to:

receive a selection of a location on a map;

determine the at least one audio file corresponding to the location on the map; and retrieve the at least one audio file.

15. The computer program product according to claim 13, wherein the computer program code is configured to, when executed, cause the computer to determine a representative audio segment for each of the one or more audio segments by causing the computer to:

identify, based on the generated one or more event identifiers, an audio event associated with a respective audio segment;

locate a representation of the audio event in a representative audio segment database; and select the located representation as the representative audio segment for the respective audio segment.

16. The computer program product according to claim 13, wherein the computer program code is configured to, when executed, cause the computer to determine a representative audio segment for each of the one or more audio segments by causing the computer to:

divide the audio segment into one or more audio pieces; and rearrange the one or more audio pieces to create the representative audio segment.

17. The computer program product according to claim 13, wherein combining the one or more of the representative audio segments of the one or more audio segments comprises at least one of mixing, cross-fading, overlapping, and concatenating the one or more representative audio segments.

18. The computer program product according to claim 17, wherein the computer program code is configured to, when executed, cause the computer to combine the one or more of the representative audio segments of the one or more audio segments by causing the computer to:

select an initial representative audio segment;

determine a difference between the signal of an end portion of the initial representative audio segment and the signal of a beginning portion of each of the remaining representative audio segments; and concatenate one of the remaining representative audio segments to the end of the initial representative audio segment, wherein the difference between the signal of the beginning portion of the one of the remaining representative audio segments and the signal of the end portion of the initial one representative audio segment is less than a predefined threshold.

* * * * *